US010160490B2

(12) United States Patent
Fukukawa et al.

(10) Patent No.: US 10,160,490 B2
(45) Date of Patent: Dec. 25, 2018

(54) VEHICLE CONTROL DEVICE

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi (JP); DENSO CORPORATION, Kariya-shi, Aichi (JP)

(72) Inventors: Shogi Fukukawa, Nagoya (JP); Motonari Obayashi, Nagakute (JP); Kiyoshi Takahashi, Hekinan (JP); Hironobu Ishijima, Toyota (JP); Yuichi Mizutani, Chita-gun (JP); Takatomo Asai, Nagoya (JP)

(73) Assignees: AISIN SEIKI KABUSHIKI KAISHA, Kariya-shi, Aichi (JP); TOYOTA JIDOSHA KABUSHIKI KAISHA, Toyota-shi, Aichi (JP); DENSO CORPORATION, Kariya-shi, Aichi (JP)

( * ) Notice: Subject to any disclaimer, the term of this patent is extended or adjusted under 35 U.S.C. 154(b) by 0 days.

(21) Appl. No.: 15/509,746

(22) PCT Filed: Sep. 10, 2015

(86) PCT No.: PCT/JP2015/075693
§ 371 (c)(1),
(2) Date: Mar. 8, 2017

(87) PCT Pub. No.: WO2016/039409
PCT Pub. Date: Mar. 17, 2016

(65) Prior Publication Data

US 2017/0259849 A1 Sep. 14, 2017

(30) Foreign Application Priority Data

Sep. 12, 2014 (JP) ................................ 2014-186767

(51) Int. Cl.
*B62D 6/00* (2006.01)
*B62D 11/00* (2006.01)
(Continued)

(52) U.S. Cl.
CPC ............ *B62D 15/025* (2013.01); *B62D 6/02* (2013.01); *B62D 15/021* (2013.01);
(Continued)

(58) Field of Classification Search
CPC ...... B62D 15/025; B62D 6/02; B62D 15/021; B62D 6/00; B62D 5/04; B62D 6/08; G01C 21/34; G06F 19/00; B62B 5/04
(Continued)

(56) References Cited

U.S. PATENT DOCUMENTS

2009/0240389 A1* 9/2009 Nomura ................ B62D 5/046 701/31.4
2010/0012438 A1* 1/2010 Sonnendorfer ..... B60B 33/0021 188/19
2016/0001814 A1* 1/2016 Endo ................... B62D 5/0466 701/41

FOREIGN PATENT DOCUMENTS

JP 2000-122719 A 4/2000
JP 2002-347645 A 12/2002
(Continued)

OTHER PUBLICATIONS

Notification of Reasons for Refusal for JP 2014-186767 dated May 30, 2016.
(Continued)

*Primary Examiner* — Mahmoud S Ismail
(74) *Attorney, Agent, or Firm* — Sughrue Mion, PLLC

(57) ABSTRACT

A vehicle control device according to an embodiment includes: a steering controller configured to control steering of a vehicle; and a controller configured to, when the vehicle
(Continued)

is located at a first position on a travel route, instruct the steering controller to control the vehicle at a steering angle corresponding to a second position that is an advanced position from the first position in a traveling direction on the travel route.

5 Claims, 12 Drawing Sheets

(51) Int. Cl.

| | |
|---|---|
| ***B62D 12/00*** | (2006.01) |
| ***B63G 8/20*** | (2006.01) |
| ***B63H 25/04*** | (2006.01) |
| ***G05D 1/00*** | (2006.01) |
| ***G06F 7/00*** | (2006.01) |
| ***G06F 17/00*** | (2006.01) |
| ***G06F 19/00*** | (2018.01) |
| ***B62D 15/02*** | (2006.01) |
| ***B62D 6/02*** | (2006.01) |
| ***G01C 21/34*** | (2006.01) |
| *G01M 17/00* | (2006.01) |
| *B62B 5/04* | (2006.01) |

(52) U.S. Cl.
CPC ....... *B62D 15/027* (2013.01); *B62D 15/0285* (2013.01); *G01C 21/34* (2013.01)

(58) Field of Classification Search
USPC .................................... 701/41, 31.4; 188/19
See application file for complete search history.

(56) References Cited

FOREIGN PATENT DOCUMENTS

| | | | |
|---|---|---|---|
| JP | 2003-276623 | A | 10/2003 |
| JP | 2004-314692 | A | 11/2004 |
| JP | 2006-008009 | A | 1/2006 |
| JP | 2006-182249 | A | 7/2006 |

OTHER PUBLICATIONS

Notification of Reasons for Refusal for JP 2014-186767 dated Aug. 23, 2016.
International Search Report for PCT/JP2015/075693 dated Dec. 8, 2015.

* cited by examiner

VEHICLE CONTROL DEVICE

This application is national stage application of International Application No. PCT/JP2015/075693, filed Sep. 10, 2015, which designates the United States, incorporated herein by reference, and which is based upon and claims the benefit of priority from Japanese Patent Application No. 2014-186767, filed Sep. 12, 2014, the entire contents of which are incorporated herein by reference.

TECHNICAL FIELD

The present invention relates to a vehicle control device.

BACKGROUND ART

Conventionally, there have been known steering assistance or automatic steering techniques to run a vehicle in accordance with a travel locus in order to guide it to a target position.

CITATION LIST

Patent Literature

Patent Literature 1: Japanese Patent Application Laid-open No. 2006-8009

SUMMARY OF INVENTION

Problem to be Solved by the Invention

However, the conventional techniques do not take into account a delay due to a mechanism or friction in controlling a steering angle for the steering assistance or automatic steering. Such a delay by the mechanism or friction at the time of controlling the steering angle may cause the vehicle to deviate from a travel route set by the steering assistance or automatic steering.

Means for Solving Problem

A vehicle control device according to an embodiment comprises: a steering controller configured to control steering of a vehicle; and a controller configured to, when the vehicle is located at a first position on a travel route, instruct the steering controller to control the vehicle at a steering angle corresponding to a second position, the second position being an advanced position of the vehicle from the first position in a traveling direction on the travel route. This can thus improve the traveling accuracy of the vehicle along the travel route, for example.

The vehicle control device according to the embodiment further comprises a generator configured to generate a travel route to guide the vehicle to a target position, wherein when the vehicle is located at the first position on the travel route generated by the generator, the controller instructs the steering controller to control the vehicle at a steering angle corresponding to the second position on the travel route. This can thus improve the traveling accuracy of the vehicle along the generated travel route, for example.

The vehicle control device according to the embodiment further comprises a speed acquirer configured to acquire a speed of the vehicle, wherein the controller instructs the steering controller to control the vehicle at a steering angle adjusted in accordance with a delay time, the delay time being a time based on the speed of the vehicle acquired by the speed acquirer from a receipt of a steering command by the steering controller to a start of steering. This can thus make it possible to deal with a steering delay which varies with the speed, thereby improving the traveling accuracy, for example.

The vehicle control device according to the embodiment further comprises a steering acquirer configured to acquire information on steering performed in the vehicle, wherein the controller instructs the steering controller to control the vehicle at a steering angle depending on a result of determination of whether the steering of the vehicle corresponds to additional steering, based on the information on steering acquired by the steering acquirer. This can thus make it possible to deal with a steering delay which varies depending on additional steering or non-additional steering, thereby improving the traveling accuracy, for example.

The vehicle control device according to the embodiment further comprises a steering angle acquirer configured to acquire a steering angle of the vehicle, wherein the controller corrects a steering angle corresponding to the second position to be provided to the steering controller, based on a difference between a steering angle corresponding to the first position and the steering angle of the vehicle acquired by the steering angle acquirer. Thus, the correction based on the difference can improve the traveling accuracy, for example.

The vehicle control device according to the embodiment further comprises an acquirer configured to acquire a speed or acceleration of the vehicle, wherein when the vehicle is located at the first position on the travel route and when the second position of the vehicle advancing based on the speed or acceleration currently acquired by the acquirer is closer to the first position than a third position of the vehicle advancing based on the speed or acceleration previously acquired, the controller instructs the steering controller to continue a steering angle corresponding to the third position. This can thus prevent the steering angle from returning, thereby preventing a driver from feeling strangeness.

BRIEF DESCRIPTION OF DRAWINGS

FIG. 1 is an exemplary perspective view of a vehicle according to a first embodiment, with part of a cabin seen through;

DESCRIPTION OF EMBODIMENTS

Exemplary embodiments of the present invention will be disclosed below. Configurations according to the embodiments described below, and operations, results, and effects achieved by these configurations are merely exemplary. The present invention can achieve any configuration other than the configurations disclosed in the embodiments below. The present invention can attain at least one of various kinds of effects (including secondary effects) resulting from the basic configurations.

First Embodiment

A vehicle 1 according to a first embodiment may be, for example, an automobile having an internal combustion engine (not illustrated) as a drive source, that is, an internal combustion engine automobile; may be an automobile having an electric motor (not illustrated) as a drive source, that is, an electric vehicle or a fuel cell electric vehicle; may be a hybrid vehicle having both of the internal combustion engine and the electric motor as drive sources; or may be an automobile having other drive sources. The vehicle 1 can mount a variety of transmissions and a variety of devices required to drive an internal combustion engine and an electric motor, such as systems and components. The style, number, and layout of devices for driving wheels 3 of the vehicle 1 can be set in various ways.

Figure 1:
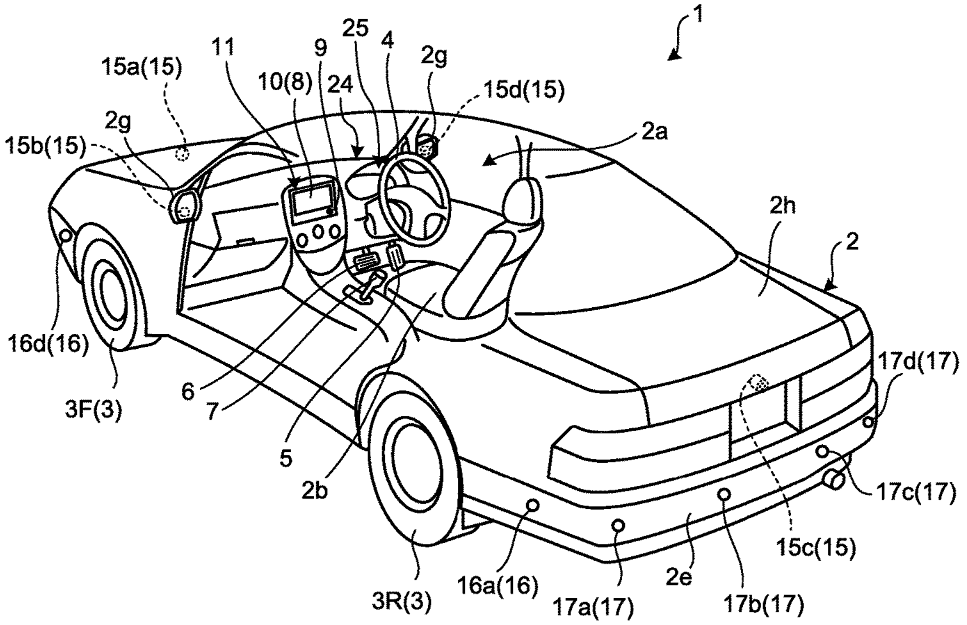

As illustrated in FIG. 1, a vehicle body 2 includes a cabin 2*a* in which an occupant (not illustrated) rides. The cabin 2*a* includes a steering element 4, an accelerator 5, a braking element 6, and a gear shifter 7 which face a seat 2*b* of a driver as an occupant. The steering element 4 is a steering wheel protruding from a dash board 24, for example. The accelerator 5 is an acceleration pedal positioned at the driver's foot, for example. The braking element 6 is a brake pedal positioned at the driver's foot, for example. The gear shifter 7 is a shift lever protruding from a center console, for example. The steering element 4, the accelerator 5, the braking element 6, and the gear shifter 7 are not limited to the above.

In the cabin 2*a*, a display 8 as a display output unit and a sound output device 9 as a sound output unit are provided. The display 8 is a liquid crystal display (LCD) or an organic electroluminescent display (OELD), for example. The sound output device 9 is a speaker, for example. The display 8 is covered by a transparent operation input device 10 such as a touch panel. An occupant can view an image on a screen of the display 8 via the operation input device 10. The occupant can also touch, press, or manipulate the operation input device 10 with his or her finger at a position corresponding to the image on the screen of the display 8. The display 8, the sound output device 9, and the operation input device 10 are included in a monitor unit 11 positioned in the center of the width of the vehicle, that is, in the horizontal direction of the dash board 24, for example. The monitor unit 11 can be equipped with an operation input device (not illustrated) such as a switch, a dial, a joystick, and a push button. A sound output device (not illustrated) can be provided at different positions in the cabin 2*a* other than in the monitor unit 11, and sound can be output from the sound output device 9 of the monitor unit 11 and another sound output device. The monitor unit 11 can also be used as a navigation system and an audio system, for example.

Figure 3:
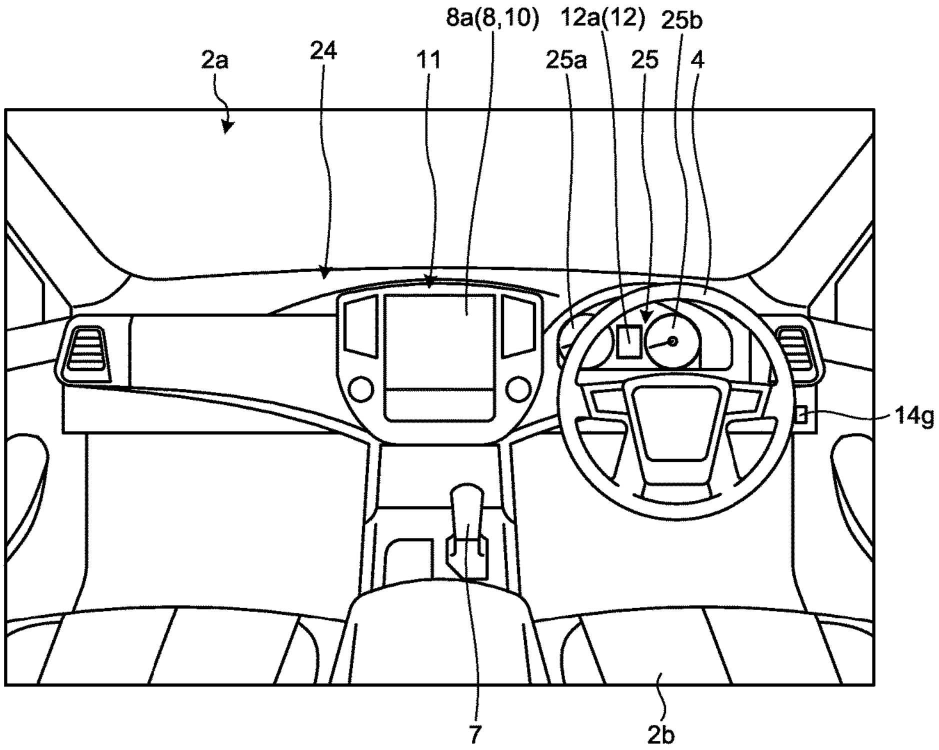
FIG. 3 is a diagram of an example of a dash board of the vehicle when viewed from the rear side of the vehicle, according to the first embodiment.

In the cabin 2*a*, a display 12 different from the display 8 is provided. As illustrated in FIG. 3, the display 12 is provided on an instrument panel 25 of the dash board 24, for example, and is positioned between a speed indicator 25*a* and a revolution indicator 25*b*, approximately at the center of the instrument panel 25. The size of a screen 12*a* of the display 12 is smaller than that of a screen 8*a* of the display 8. The display 12 can primarily display an image indicating information on parking assistance of the vehicle 1. The amount of information displayed on the display 12 may be smaller than that displayed on the display 8. The display 12 is an LCD or an OELD, for example. The display 8 may display information displayed on the display 12.

Figure 2:
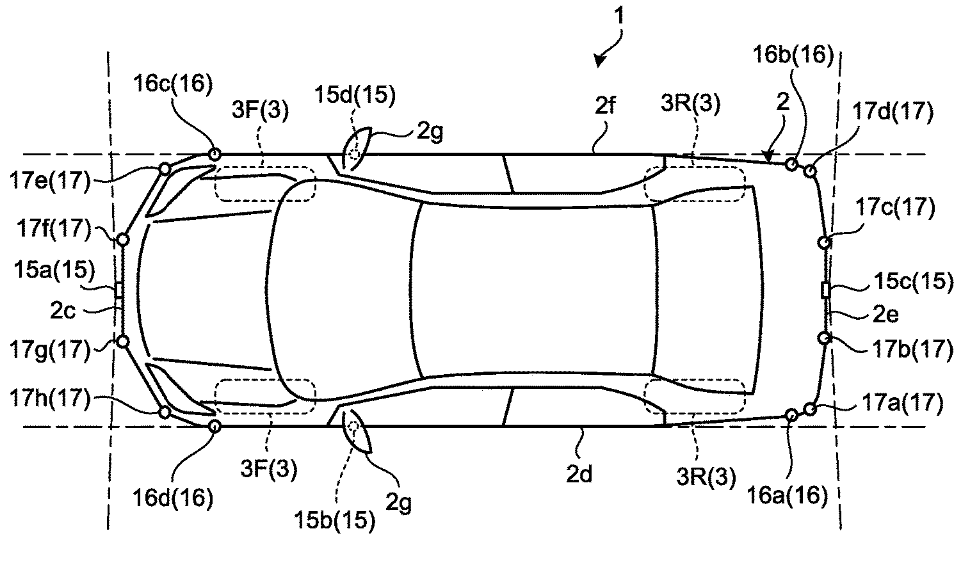
FIG. 2 is an exemplary plan view (overhead view) of the vehicle according to the first embodiment.
Figure 4:
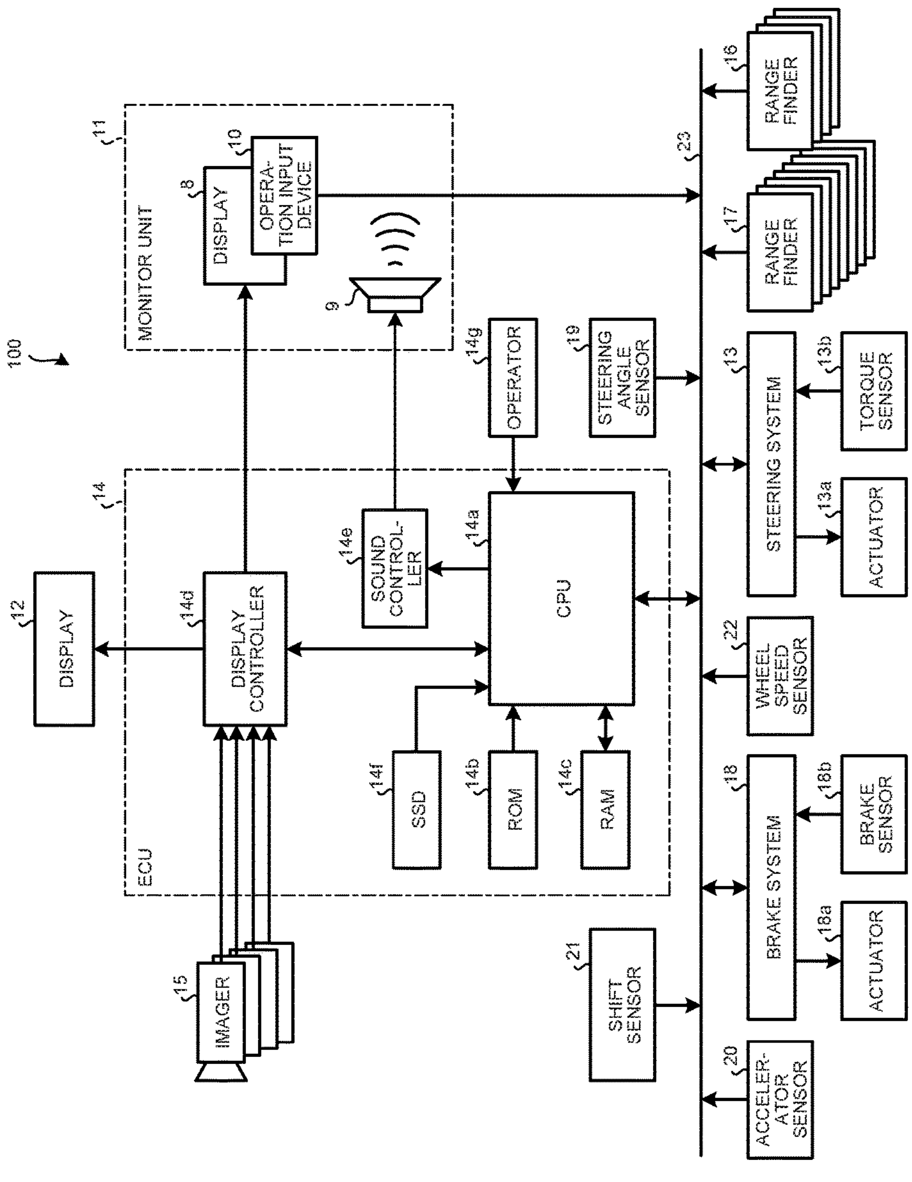
FIG. 4 is an exemplary block diagram of a configuration of a parking assistance system according to the first embodiment.

As illustrated in FIGS. 1 and 2, the vehicle 1 is a four-wheel automobile and has two right and left front wheels 3F and two right and left rear wheels 3R. All of the four wheels 3 may be steerable. As illustrated in FIG. 4, the vehicle 1 includes a steering system 13 configured to steer at least two of the wheels 3.

The steering system 13 includes an actuator 13*a* and a torque sensor 13*b*, and controls the steering of the vehicle 1. The steering system 13 is electrically controlled by an electronic control unit (ECU) 14, for example, to operate the actuator 13*a*. The steering system 13 is an electric power steering system or a steer-by-wire (SBW) system, for example. The steering system 13 controls the actuator 13*a* to add torque or assist torque to the steering element 4 to supplement steering force; or controls the actuator 13*a* to steer the wheels 3. In this case, the actuator 13*a* may steer a single wheel 3 or multiple wheels 3. The torque sensor 13*b* detects torque applied to the steering element 4 by the driver, for example.

As illustrated in FIG. 2, the vehicle body 2 is provided with imagers 15, that is, four imagers 15*a* to 15*d*, for example. The imagers 15 are digital cameras that incorporate imaging element such as a charge coupled device (CCD) and a CMOS image sensor (CIS), for example. The imagers 15 can output moving image data at a predetermined frame rate. The imagers 15 each include a wide-angle lens or a fish-eye lens and can horizontally capture an image in the range of 140° to 190°, for example. The optical axis of each of the imagers 15 is set to be directed obliquely downward. Thus, the imagers 15 successively image the external environment around the vehicle body 2, which includes road surfaces on which the vehicle 1 can travel and parking-possible areas in which the vehicle 1 can be parked, and output it as captured image data.

The imager 15*a* is positioned on the front side of the vehicle body 2, that is, at a front end 2*c* in the vehicle fore-and-aft direction, for example. The imager 15*a* is provided on a front bumper, for example. The imager 15*b* is positioned on the left side of the vehicle body 2, that is, at a left-side end 2*d* in the vehicle width direction, for example. The image 15*b* is provided on a protruding part such as a left-side door mirror 2*g*, for example. The imager 15*c* is positioned at a rear end 2*e* of the vehicle body 2, and is provided on a lower wall of a door (not illustrated) of a rear trunk, for example. The imager 15*d* is positioned at a right-side end 2*f* of the vehicle body 2, and is provided on a right-side door mirror 2*g*, for example. The ECU 14 can perform arithmetic processing and image processing based on image data obtained by the imagers 15 to generate an image having a wider viewing angle or generate a virtual overhead image of the vehicle 1 viewed from above. The overhead image can also be referred to as a plane image.

The ECU 14 also identifies division lines and the like on road surfaces around the vehicle 1 from images obtained by the imagers 15, and detects (extracts) a parking section designated by division lines.

As illustrated in FIGS. 1 and 2, in the vehicle body 2, four range finders 16*a* to 16*d* and eight range finders 17*a* to 17*h* are provided as a plurality of range finders 16 and 17, for example. Each of the range finders 16 and 17 is a sonar that emits ultrasound and captures its reflected wave, for example. The sonar can also be referred to as a sonar sensor or an ultrasonic detector. The ECU 14 can detect the presence of an object such as an obstacle located around the vehicle 1 and measure the distance to the object, based on results of detection from the range finders 16 and 17. Thus, each of the range finders 16 and 17 is an example of a detector configured to detect objects. The range finders 17 can be used to detect objects at a relatively short distance, for example, while the range finders 16 can be used to detect objects at a relatively long distance longer than that of the range finders 17, for example. The range finders 17 can be used to detect objects ahead of and behind the vehicle 1, while the range finders 16 can be used to detect objects at the lateral sides of the vehicle 1, for example.

As illustrated in FIG. 4, in a parking assistance system 100, a brake system 18, a steering angle sensor 19, an accelerator sensor 20, a shift sensor 21, and a wheel speed sensor 22 are electrically connected to one another via an in-vehicle network 23 as an electric telecommunication line, in addition to the ECU 14, the monitor unit 11, the steering system 13, and the range finders 16 and 17. The in-vehicle network 23 is configured as a controller area network (CAN), for example. The ECU 14 can control the steering system 13 and the brake system 18 by transmitting control signals thereto via the in-vehicle network 23. The ECU 14 can also receive results of detection from the torque sensor 13*b*, a brake sensor 18*b*, the steering angle sensor 19, the range finders 16, the range finders 17, the accelerator sensor 20, the shift sensor 21, and the wheel speed sensor 22; and receive operation signals from the operation input 10 via the in-vehicle network 23, for example.

The ECU 14 includes a central processing unit (CPU) 14*a*, a read only memory (ROM) 14*b*, a random access memory (RAM) 14*c*, a display controller 14*d*, a sound controller 14*e*, and a solid state drive (SSD, flash memory) 14*f*, for example. The CPU 14*a* can perform a variety of calculations and control, such as image processing to images displayed on the displays 8 and 12, determination of a target travel position of the vehicle 1, calculation of a travel route of the vehicle 1, determination of whether there is an object interference, automatic control of the vehicle 1, and cancel of the automatic control. The CPU 14*a* can read a computer program installed and stored in a nonvolatile memory such as the ROM 14*b*; and perform calculations in accordance with the computer program. The RAM 14*c* temporarily stores therein various types of data to be used for calculations by the CPU 14*a*. Among the calculations by the ECU 14, the display controller 14*d* primarily performs image processing based on the image data obtained by the imagers 15 and synthesizes image data displayed on the display 8. The sound controller 14*e* primarily processes sound data output from the sound output device 9, among the calculations by the ECU 14. The SSD 14*f* is a rewritable nonvolatile memory and can store therein data even during the power-off of the ECU 14. The CPU 14*a*, the ROM 14*b*, and the RAM 14*c* can be integrated in the same package. The ECU 14 may include other logical operation processor such as a digital signal processor (DSP) or logic circuitry instead of the CPU 14*a*. A hard disk drive (HDD) may be provided instead of the SSD 14*f*, and the SSD 14*f* and the HDD may be provided separately from the ECU 14.

The brake system 18 is, for example, an anti-lock brake system (ABS) that prevents locking of the brake; an electronic stability control (ESC) that prevents a skid of the vehicle 1 during cornering; an electric brake system that increases braking force (performs brake assist); or brake by wire (BBW). The brake system 18 applies braking force to the wheels 3 and to the vehicle 1 via an actuator 18*a*. The brake system 18 can implement a variety of brake control by detecting locking of the brake, idling of the wheels 3, and an indication of a skid from the difference in rotation between the right and left wheels 3. The brake sensor 18*b* is a sensor configured to detect the position of a movable part of the braking element 6, for example. The brake sensor 18*b* can detect the position of a brake pedal serving as the movable part. The brake sensor 18*b* includes a displacement sensor.

The steering angle sensor 19 is a sensor configured to detect the steering amount of the steering element 4 such as a steering wheel, for example. The steering angle sensor 19 is formed of a Hall element, for example. The ECU 14 acquires the steering amount of the steering element 4 by the driver or the steering amount of each wheel 3 during automatic steering from the steering angle sensor 19, so that a variety of control is implemented. The steering angle sensor 19 detects the turning angle of a rotatable part of the steering element 4. The steering angle sensor 19 is an example of an angle sensor.

The accelerator sensor 20 is a sensor configured to detect the position of a movable part of the accelerator 5, for example. The accelerator sensor 20 can detect the position of an accelerator pedal serving as the movable part. The accelerator sensor 20 includes a displacement sensor.

The shift sensor 21 is a sensor configured to detect the position of a movable part of the gear shifter 7, for example. The shift sensor 21 can detect the position of a lever, an arm, or a button serving as the movable part. The shift sensor 21 may include a displacement sensor or may be configured as a switch.

The wheel speed sensor 22 is a sensor configured to detect the rotation amount and the rotation speed of the wheel(s) 3 per unit time. The wheel speed sensor 22 outputs a wheel speed pulse number indicating the detected rotation speed, as a sensor value. The wheel speed sensor 22 can be formed of a Hall element, for example. The ECU 14 calculates the travel amount of the vehicle 1 based on the sensor value acquired from the wheel speed sensor 22, so that a variety of control is implemented. The wheel speed sensor 22 may be provided in the brake system 18. In this case, the ECU 14 acquires results of the detection from the wheel speed sensor 22 via the brake system 18.

The configurations, arrangements, and electrical connections of the various sensors and actuators described above are merely exemplary, and can be set (changed) in various ways.

Figure 5:
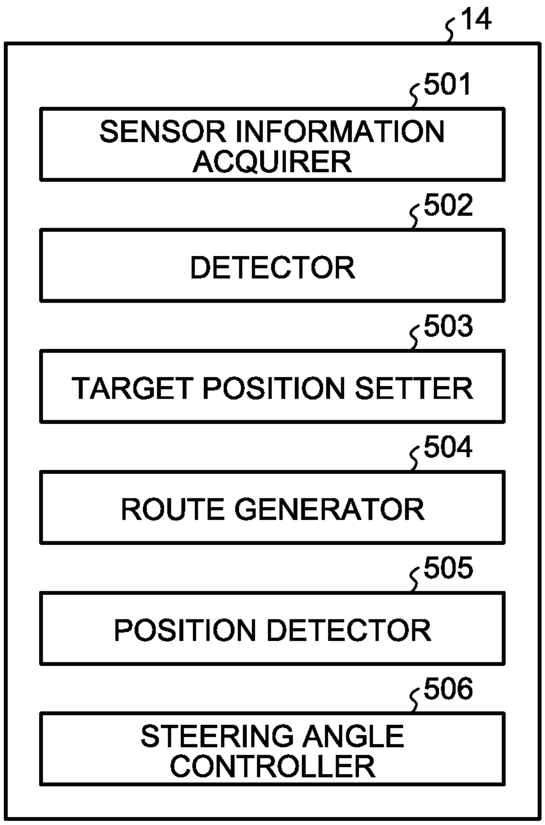
FIG. 5 is an exemplary block diagram of a configuration of an ECU of the parking assistance system according to the first embodiment.

As illustrated in FIG. 5, the ECU 14 includes a sensor information acquirer 501, a detector 502, a target position setter 503, a route generator 504, a position detector 505, and a steering angle controller 506. The configurations illustrated in FIG. 5 are implemented by causing the CPU 14*a* of the ECU 14 to execute a computer program stored in the ROM 14*b*. These configurations may be implemented by hardware.

The ECU 14 of the vehicle 1 according to the present embodiment performs parking assistance for guiding the vehicle 1 to a target position (parking position of the vehicle 1, for example). For example, the ECU 14 according to the present embodiment displays, on the display 12, guide information to prompt the driver to operate the accelerator pedal, the brake pedal, and the gear shifter 7. For example, when the driver has operated at least either the accelerator pedal or the gear shifter 7 in accordance with the guide information and the vehicle 1 has traveled, the ECU 14 controls the steering system 13 in accordance with the traveled distance of the vehicle 1 so that the vehicle 1 travels on the set travel route. Thus, steering depending on the traveled distance is implemented, thereby enabling the vehicle 1 to travel to the target position.

Figure 6:
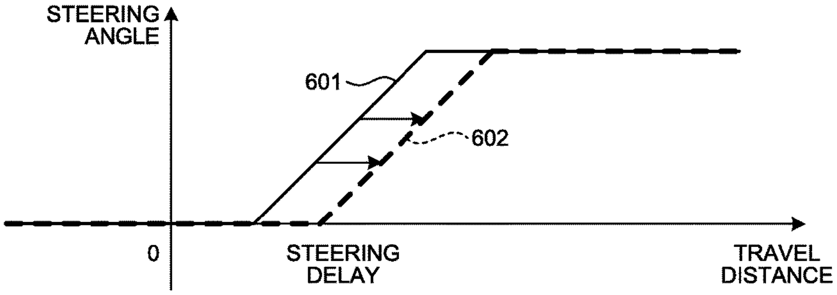
FIG. 6 is a diagram illustrating a steering delay in controlling the traveling of a conventional vehicle.

Conventional techniques of steering assistance or automatic steering do not take into account a delay in the steering caused by a mechanism, friction, and the like, at the time of controlling a steering angle to control the traveling of a vehicle to the target position. FIG. 6 is a diagram illustrating a steering delay in controlling the traveling of a conventional vehicle. FIG. 6 illustrates an example of an actual steering angle 602 due to the steering delay with respect to a target steering angle 601 corresponding to the travel distance. Such a delay in the actual steering angle from the target steering angle (hereinafter referred to as steering delay) also causes a deviation in the travel route.

Figure 7:
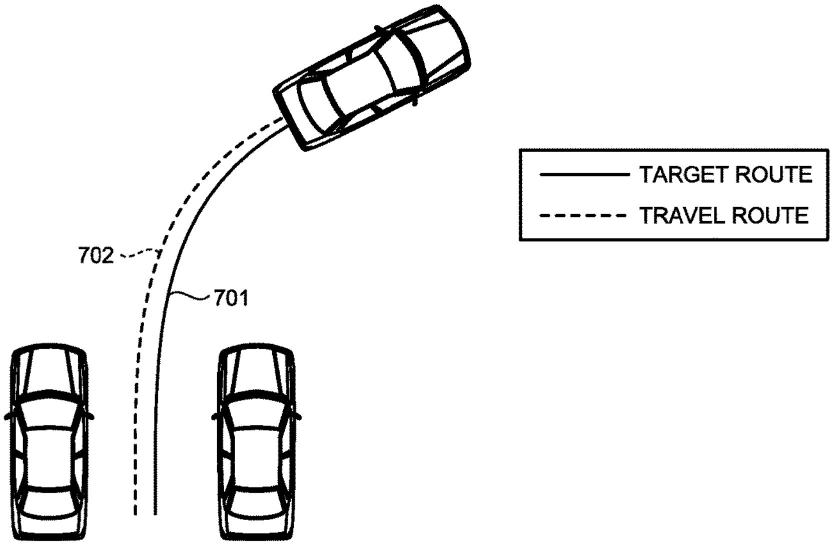
FIG. 7 is a diagram illustrating a difference caused by a steering delay between a target route and an actual travel route of the conventional vehicle.

FIG. 7 is a diagram illustrating a difference caused by a steering delay between a target route and an actual travel route of the conventional vehicle. In FIG. 7, the vehicle runs on an actual travel route 702 due to a steering delay caused by the reason as described above when controlled to travel following a target route 701. As illustrated in FIG. 7, a steering delay causes the vehicle to deviate from the target route. For this reason, it is preferable to control the steering without a steering delay. In view of this, the ECU 14 according to the present embodiment prevents a steering delay by instructing the steering system 13 to implement a steering angle looked ahead by the steering delay. The following describes the configurations of FIG. 5.

The sensor information acquirer 501 acquires information from the various sensors provided in the vehicle 1. The sensor information acquirer 501 according to the present embodiment acquires: wheel speed information from the wheel speed sensor 22; ranging information from the range finders 16 and 17; steering angle information from the steering angle sensor 19; acceleration information from the accelerator sensor 20; shift information from the shift sensor 21; brake information from the brake sensor 18*b*; and steering torque information from the torque sensor 13*b*. The sensor information acquirer 501 according to the present embodiment acquires speed information of the vehicle 1 based on the wheel speed information from the wheel speed sensor 22. The sensor information acquirer 501 may further acquire acceleration from an acceleration sensor (not illustrated).

The detector 502 detects an obstacle around the vehicle 1, based on the ranging information from the range finders 16 and 17 that is acquired by the sensor information acquirer 501.

The detector 502 also detects a parking-possible area in which the vehicle 1 can be parked, based on the ranging information from the range finders 16 and 17 that is acquired by the sensor information acquirer 501.

The target position setter 503 sets a target position to which the vehicle 1 travels. The target position setter 503 according to the present embodiment sets the target position in the parking-possible area detected by the detector 502. When there are two or more parking-possible areas, the target position setter 503 sets as the target position an area selected by the driver via an operator 14*g* or the operation input 10 out of the parking-possible areas.

The route generator 504 generates a travel route of the vehicle 1 to the target position set by the target position setter 503. The route generator 504 generates a travel route by geometrical computations based on a current position and the target position of the vehicle 1. The route generator 504 according to the present embodiment may generate a travel route after setting a turn-around point at which the traveling direction of the vehicle 1 is changed.

The position detector 505 detects the current position of the vehicle 1. The position detector 505 according to the present embodiment detects the current position of the traveling vehicle 1 based on the ranging information, the steering angle information, the wheel speed information, and the speed information of the vehicle 1 acquired by the sensor information acquirer 501.

The steering angle controller 506 provides the steering angle to the steering system 13 based on the travel route set by the route generator 504 and the current position detected by the position detector 505 such that the vehicle 1 is controlled to follow the travel route. The steering system 13 then controls the actuator 13*a* in accordance with the provided steering angle. The steering angle controller 506 according to the present embodiment prevents a steering delay from occurring, by providing a steering instruction while looking ahead the delay due to a mechanism or friction.

Figure 8:
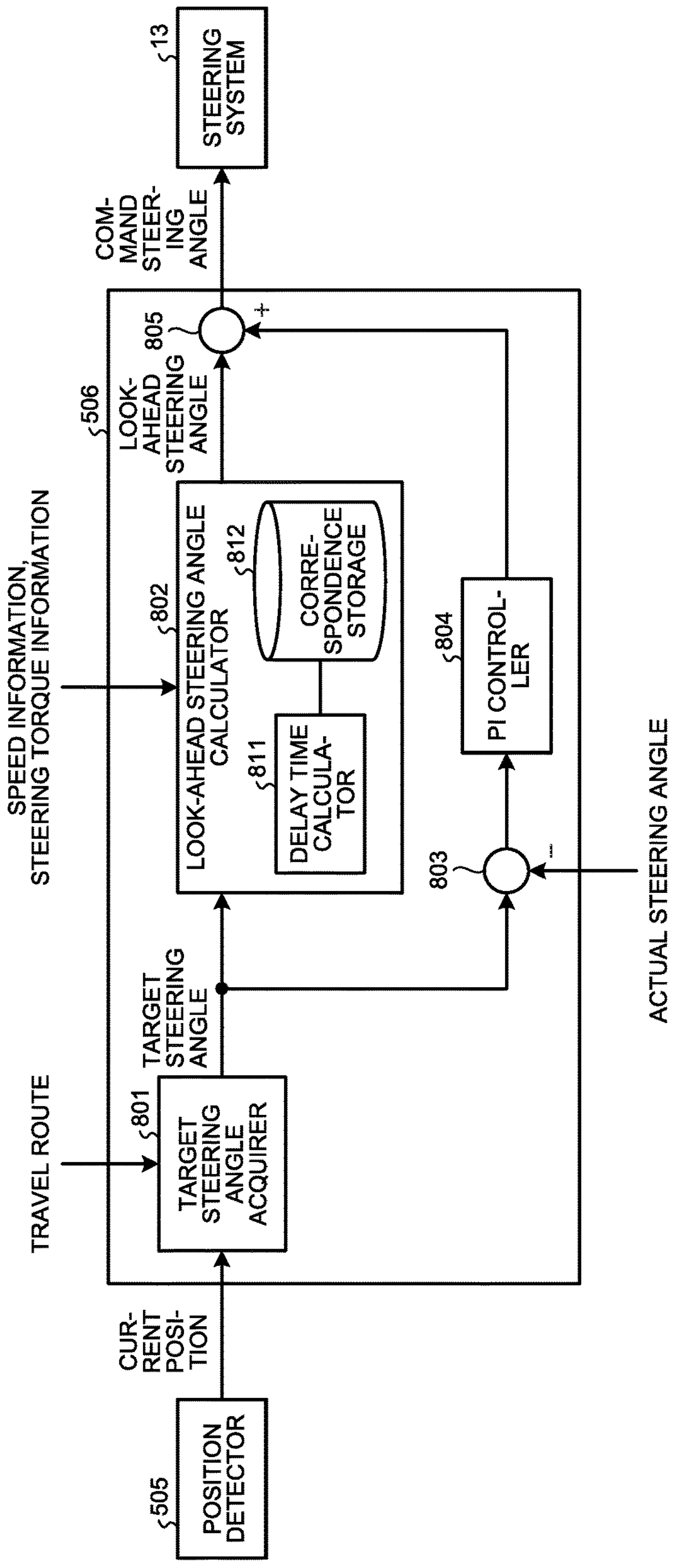
FIG. 8 is a block diagram illustrating a configuration of a steering angle controller according to the first embodiment.

FIG. 8 is a block diagram illustrating a configuration of the steering angle controller 506. As illustrated in FIG. 8, the steering angle controller 506 includes a target steering angle acquirer 801, a look-ahead steering angle calculator 802, a first calculator 803, a PI controller 804, and a second calculator 805.

The target steering angle acquirer 801 calculates and acquires a target steering angle for the vehicle 1 to travel along the travel route from the current position, on the basis of the travel route generated by the route generator 504 and the current position of the vehicle 1 detected by the position detector 505. The steering system 13 provided with this target steering angle causes a steering delay due to a mechanism, friction, or the like.

For this reason, the look-ahead steering angle calculator 802 according to the present embodiment calculates a look-ahead steering angle with the steering delay taken into account, based on the target steering angle.

Figure 9:
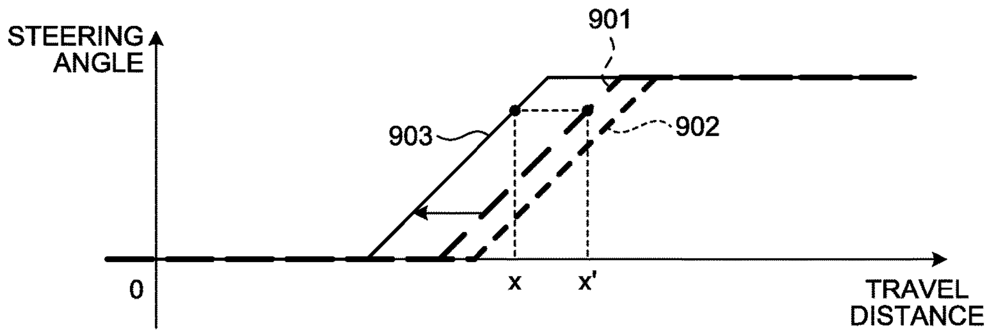
FIG. 9 is a diagram for explaining a look-ahead steering angle calculated by a look-ahead steering angle calculator according to the first embodiment.

FIG. 9 is a diagram for explaining a look-ahead steering angle calculated by the look-ahead steering angle calculator 802 according to the present embodiment. FIG. 9 illustrates the example of a target steering angle 901 and an actual steering angle 902 when a given steering angle is the target steering angle 901. The steering angle 902 delays from the target steering angle 901.

Therefore, when the vehicle 1 is located at a position of a travel distance x on the travel route, the look-ahead steering angle calculator 802 according to the present embodiment calculates, as a look-ahead steering angle, a steering angle corresponding to a position of an estimated travel distance x'. The position of the estimated travel distance x' corresponds to: the position ahead from the position of the travel distance x in the traveling direction on the travel route; and the position to which the vehicle 1 advances in a delay time from the receipt of the steering command to the actual steering by the steering system 13.

Transition 903 in FIG. 9 represents transition of the look-ahead steering angle. As illustrated in FIG. 9, the look-ahead steering angle at the position to which the vehicle 1 advances by the travel distance x has to accord with the target steering angle at the position to which the vehicle 1 advances by the estimated travel distance x'.

Although the estimated travel distance x' may be obtained by any calculation method, it may be calculated, for example, by the following expression (1):

$$x' = x + vT \qquad (1)$$

where v denotes a running speed of the vehicle 1 and T denotes the delay time.

The estimated travel distance x' of the vehicle 1 when running at a varying speed can be calculated by the following expression (2):

$$x' = x + (v + v')\cdot T/2 \qquad (2)$$

where v' denotes speed after the delay time T, v'=v+aT, and a denotes acceleration of the vehicle 1.

As described above, the estimated travel distance x' can be calculated from: information on the speed and the acceleration that can be acquired by the sensor information acquirer 501; and the delay time T.

The delay time T is calculated by a delay time calculator 811 of the look-ahead steering angle calculator 802.

A correspondence storage 812 according to the present embodiment stores therein the state of the vehicle 1 and the delay time T in association with each other. The delay time calculator 811 refers to the correspondence storage 812 and calculates the delay time T in accordance with the current state of the vehicle 1. The state of the vehicle 1 may be any parameter relevant to the delay time T of the vehicle 1. In the present embodiment, the speed of the vehicle 1 and the steering state of the vehicle 1 are used as the state of the vehicle 1.

Figure 10:
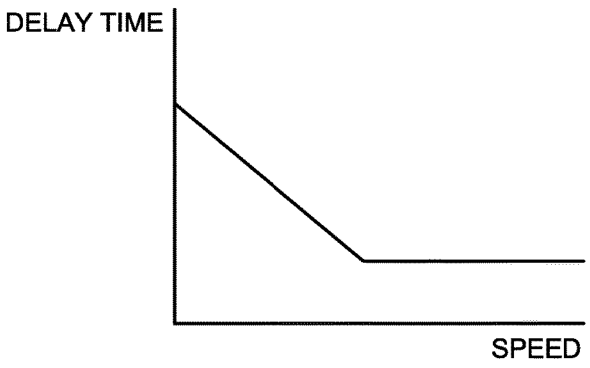
FIG. 10 is a diagram illustrating a relationship between the speed of the vehicle and delay time stored in a correspondence storage according to the first embodiment.

FIG. 10 is a diagram illustrating a relationship between the speed of the vehicle 1 and the delay time stored in the correspondence storage 812 according to the present embodiment. As illustrated in FIG. 10, the delay time varies depending on the speed of the vehicle 1. In the present embodiment, the correspondence storage stores therein such a relationship that the delay time decreases as the speed increases and becomes constant beyond a predetermined speed. The correspondence storage 812 stores therein the relation so that the delay time T can be derived from the speed of the vehicle 1. The speed of the vehicle 1 can be acquired by the sensor information acquirer 501. In other words, the sensor information acquirer 501 functions as a speed acquirer.

Thus, the steering angle controller 506 can acquire the delay time based on the speed of the vehicle 1 acquired by the sensor information acquirer 501, by referring to the correspondence storage 812. When the vehicle 1 is located at a position (position of the vehicle 1 advancing by the travel distance x, for example) on the travel route, the steering angle controller 506 can provide the steering system 13 with an instruction to implement a steering angle of the vehicle 1 adjusted based on the position and the delay time, e.g., a steering angle of the position of the estimated travel distance x' which is ahead of the travel distance x by the delay time.

Figure 11:
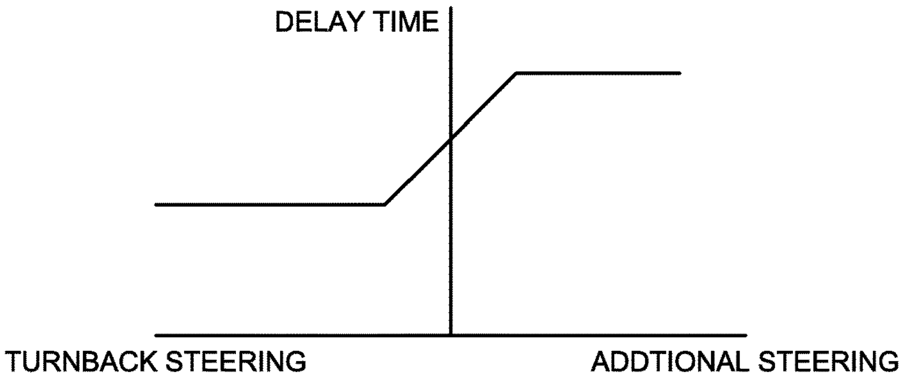
FIG. 11 is a diagram illustrating a relationship between the steering state of the vehicle and delay time stored in the corresponding storage according to the first embodiment.

FIG. 11 is a diagram illustrating a relationship between the steering state of the vehicle 1 and the delay time stored in the correspondence storage 812 according to the present embodiment. As illustrated in FIG. 11, the delay time varies depending on the steering state of the vehicle 1. That is, the delay time in the additional steering of the vehicle 1 is longer than that in the turnback steering. The additional steering or turnback steering can be determined from the steering torque information acquired by the sensor information acquirer 501. In other words, the sensor information acquirer 501 functions as a steering acquirer.

The correspondence storage 812 stores therein: a delay time corresponding to an additional steering; and a delay time corresponding to a turnback steering.

Thus, when the vehicle 1 is located at a position (position of the travel distance x) on the travel route, the steering angle controller 506 can provide the steering system 13 with an instruction to implement a steering angle adjusted based on the delay time corresponding to the additional steering or non-additional steering, according to the steering torque information of the vehicle 1 acquired by the sensor information acquirer 501.

The correspondence storage 812 also stores therein transition of the delay time to be able to smoothly switch the delay time with switching between the additional steering and the turnback steering. Thus, the ECU 14 can control the steering system 13 such that the steering angle adjusted based on the delay time corresponding to the additional steering and the steering angle adjusted based on the delay time corresponding to the turnback steering can be gradually changed with switching between the additional steering and the turnback steering of the vehicle running along the travel route.

The present embodiment has described the example of calculating the state of the vehicle 1 such as: the delay time in accordance with the speed; or whether the additional steering or non-additional steering is performed. This, however, is not intended to limit the state of the vehicle 1 for calculating the delay time to the speed or whether the additional or non-additional steering is performed. For example, the delay time may be calculated based on the steering speed, that is, the amount of change in the steering angle (differential value of the steering angle with respect to time).

When a current value of the steering system 13 is referred to and determined to approach overcurrent, the delay time may be adjusted in anticipation of a current cutoff. A steering wheel is returned when a current cutoff is occurred; therefore, considering this, the look-ahead steering angle calculator 802 can set an increased look-ahead steering angle.

In the present embodiment, the look-ahead steering angle is set based on: the delay time corresponding to the speed; and the delay time corresponding to whether the additional steering or turnback steering is performed. Any method may be used to combine the delay time corresponding to the speed and the delay time corresponding to whether the additional steering or turnback steering is performed. For example, a method of calculating an average value of two delay times can be adopted.

After a delay time calculator 811 calculates a delay time, the look-ahead steering angle calculator 802 calculates the estimated travel distance x' from the calculated delay time and the speed and acceleration of the vehicle 1 by the method described above, and calculates a look-ahead steering angle from the estimated travel distance x'.

Returning to FIG. 8, the first calculator 803 calculates a difference between the target steering angle acquired by the target steering angle acquirer 801 and the actual steering angle (steering angle information) of the vehicle 1 acquired by the sensor information acquirer 501.

The PI controller 804 calculates a feedback correction amount with respect to the steering angle by performing PI control over the difference between the steering angles calculated by the first calculator 803.

The second calculator 805 then adds the feedback correction amount to the look-ahead steering angle calculated by the look-ahead steering angle calculator 802, so that a command steering angle for output to the steering system 13 is calculated.

In other words, the steering angle controller 506 corrects the look-ahead steering angle to be output to the steering system 13, based on the difference between the target steering angle and the actual steering angle of the vehicle 1 acquired by the sensor information acquirer 501. Thus, the traveling accuracy of the vehicle 1 on the travel route can be improved.

Figure 12:
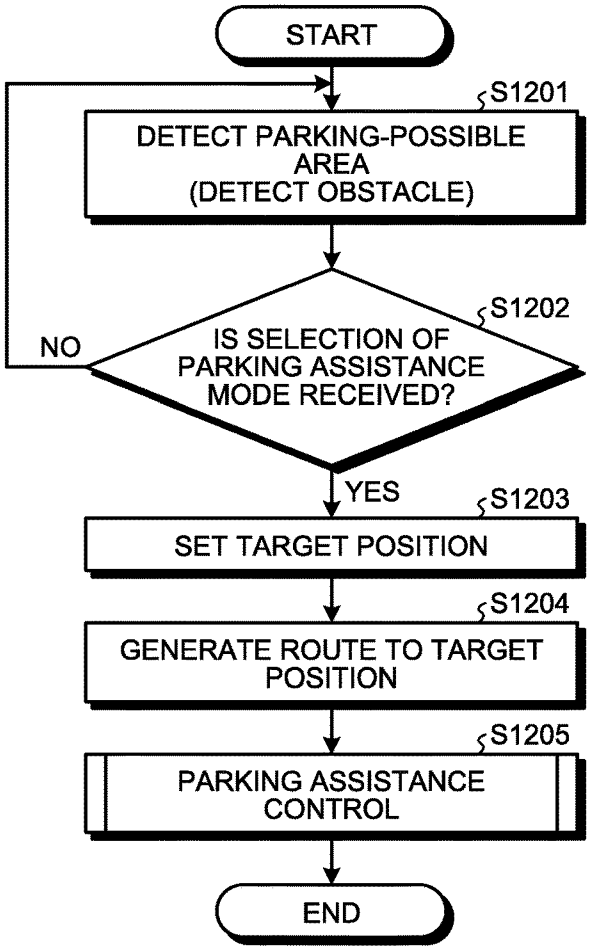
FIG. 12 is a flowchart illustrating a procedure of the ECU to shift to parking assistance control according to the first embodiment.

The following describes process of the ECU 14 of the vehicle 1 according to the first embodiment until shifting to parking assistance control. FIG. 12 is a flowchart of the above-described process of the ECU 14 according to the present embodiment.

The detector 502 first detects a parking-possible area for the vehicle 1, as well as an obstacle, based on the ranging information acquired by the sensor information acquirer 501 (Step S1201).

The ECU 14 then determines whether a selection of a parking assistance mode performed by the driver has been received via the operator 14*g* and/or the operation input device 10 (Step S1202). When determining that the selection of the parking assistance mode performed by the driver is not received (No at Step S1202), the ECU 14 determines continuity of normal running and detects an obstacle again at Step S1201.

If the ECU 14 determines that the selection of the parking assistance mode performed by the driver via the operator 14*g* and/or the operation input 10 is received (Yes at Step S1202), the target position setter 503 sets a target parking position of the vehicle 1 from the parking-possible area detected at Step S1201 (Step S1203). In the present embodiment, when two or more parking-possible areas are detected, a selection by the driver can be received. Alternatively, the target position setter 503 may automatically select a target position.

The route generator 504 then generates a travel route of the vehicle 1 to the target position (Step S1204).

The ECU 14 next performs the parking assistance control over the vehicle 1 to move to the target position, following the generated travel route (Step S1205).

Figure 13:
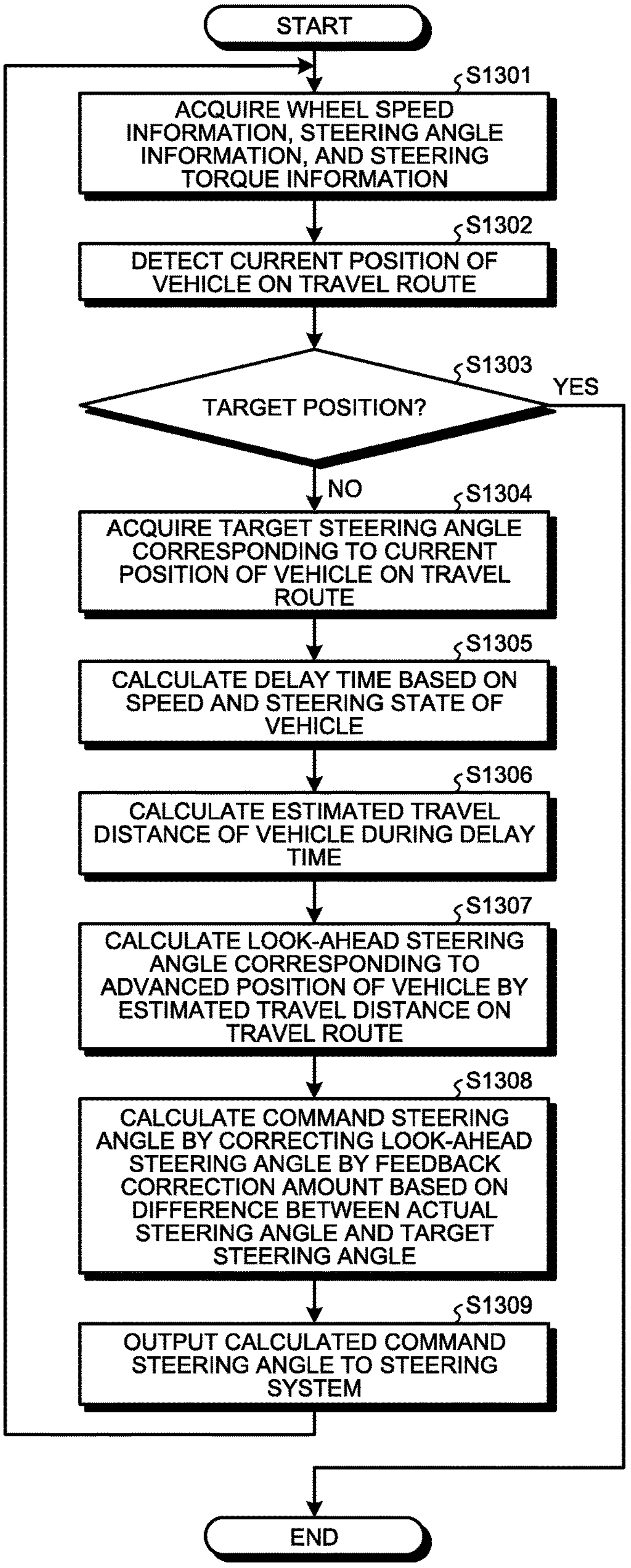
FIG. 13 is a flowchart illustrating the parking assistance control procedure of the ECU according to the first embodiment.

Thus, the ECU 14 starts the parking assistance control. The following describes the parking assistance control at Step S1205 in FIG. 12 by the ECU 14 of the vehicle 1 according to the present embodiment. FIG. 13 is a flowchart of the above-described process of the ECU 14 according to the present embodiment.

The sensor information acquirer 501 first acquires various information at least such as wheel speed information, steering angle information, and steering torque information from the various sensors (Step S1301). At this time, the sensor information acquirer 501 acquires the speed of the vehicle 1 from the wheel speed information. The sensor information acquirer 501 also acquires acceleration from the acceleration sensor.

The position detector 505 then detects a current position of the vehicle 1 based on the various information acquired by the sensor information acquirer 501 (Step S1302).

The ECU 14 then determines whether the detected current position is the target position (Step S1303).

If the ECU 14 determines that the detected current position is not the target position (No at Step S1303), the target steering angle acquirer 801 in the steering angle controller 506 acquires a target steering angle corresponding to the current position of the vehicle on the travel route, based on the travel route and the current position (Step S1304).

The delay time calculator 811 calculates a delay time based on the speed and the steering state (additional steering or turnback steering) of the vehicle 1 (Step S1305).

The look-ahead steering angle calculator 802 calculates an estimated travel distance that is a distance traveled by the vehicle 1 during the delay time (Step S1306). The look-ahead steering angle calculator 802 then calculates a look-ahead steering angle corresponding to an advanced position of the vehicle 1 by the estimated travel distance on the travel route (Step S1307).

The first calculator 803 calculates a difference between the target steering angle and the actual steering angle, and the PI controller 804 performs PI control over the difference to calculate a feedback correction amount. Thereafter, the second calculator 805 calculates a command steering angle by correcting the look-ahead steering angle by the feedback correction amount (subtracting the feedback correction amount from the look-ahead steering angle) (Step S1308).

The steering angle controller 506 outputs the calculated command steering angle to the steering system 13 (Step S1309). Thus, the steering system 13 controls steering based on the command steering angle.

Thereafter, the process is repeated from Step S1301. When determining that the detected current position is the target position (Yes at Step S1303), the ECU 14 ends the process.

Through the process described above, steering is controlled to be at the look-ahead steering angle by the delay time; and the steering angle is corrected by the feedback correction amount. With this process, the traveling accuracy of the vehicle 1 on the travel route can be improved under the steering control by the steering system 13.

Second Embodiment

In the first embodiment, the steering system 13 is controlled using a look-ahead steering angle depending on the state of the vehicle 1 (speed of the vehicle 1, for example) to prevent a steering delay. A second embodiment describes steering control based on a look-ahead steering angle when the brake is applied, in other words, when the vehicle 1 is decelerated.

Figure 14:
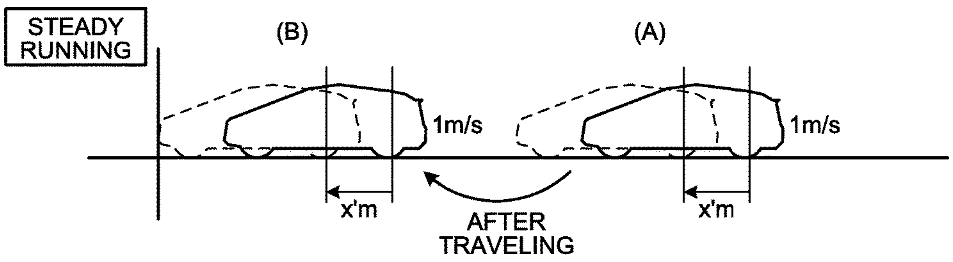
FIG. 14 is a diagram illustrating a positional relationship of a vehicle corresponding to a look-ahead steering angle during steady running according to a second embodiment.

FIG. 14 is a diagram illustrating a positional relationship of the vehicle 1 corresponding to a look-ahead steering angle during steady running, according to the second embodiment. In the example (A) of FIG. 14, the vehicle 1 is assumed to be running at 1 m/s. In this case, the steering angle controller 506 outputs, to the steering system 13, a look-ahead steering angle at the position ahead of the position (A) by the estimated travel distance x' (0.2 m, for example) as a command steering angle. At the position (B) after steady running from (A), the vehicle 1 continues to be running at 1 m/s as with at (A). In this case, the steering angle controller 506 outputs, to the steering system 13, a look-ahead steering angle at the position ahead of the position (B) by the estimated travel distance x' (0.2 m, for example) as a command steering angle. During steady running, steering is thus controlled based on the look-ahead steering angle at the advanced position of the vehicle 1 by the estimated travel distance x' m from the current position on the travel route.

Figure 15:
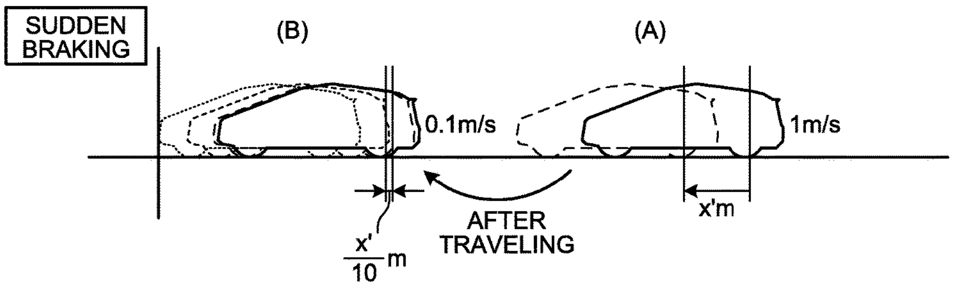
FIG. 15 is a diagram illustrating a positional relationship of the vehicle corresponding to a look-ahead steering angle during brake control according to the second embodiment.

FIG. 15 is a diagram illustrating a positional relationship of the vehicle 1 corresponding to a look-ahead steering angle during brake control, according to the present embodiment. In the example (A) of FIG. 15, the vehicle 1 is assumed to be running at 1 m/s. In this case, the steering angle controller 506 outputs, to the steering system 13, a look-ahead steering angle at the position of the vehicle 1 ahead of the position (A) by the estimated travel distance x' (0.2 m, for example) as a command steering angle. In the example illustrated as (B), the vehicle 1 is assumed to have been under brake control. As a result, the speed of the vehicle 1 is decreased to 0.1 m/s. As described in the first embodiment, the estimated travel distance depends on the speed of the vehicle 1.

In the example (B), thus, the steering angle controller 506 outputs, to the steering system 13, a look-ahead steering angle at the position of the vehicle 1 ahead of the position (B) by the estimated travel distance (x'/10) (0.02 m, for example) as a command steering angle.

As described above, a sudden brake to the vehicle 1 shortens the estimated travel distance, causing the position at which the look-ahead steering angle is acquired to relatively approach the vehicle 1. For example, under control of the steering wheel by the steering system 13 to increase the steering angle of the steering wheel in steady running, a brake control might cause the steering system 13 to control the steering wheel to turn back (return to the past state).

Figure 16:
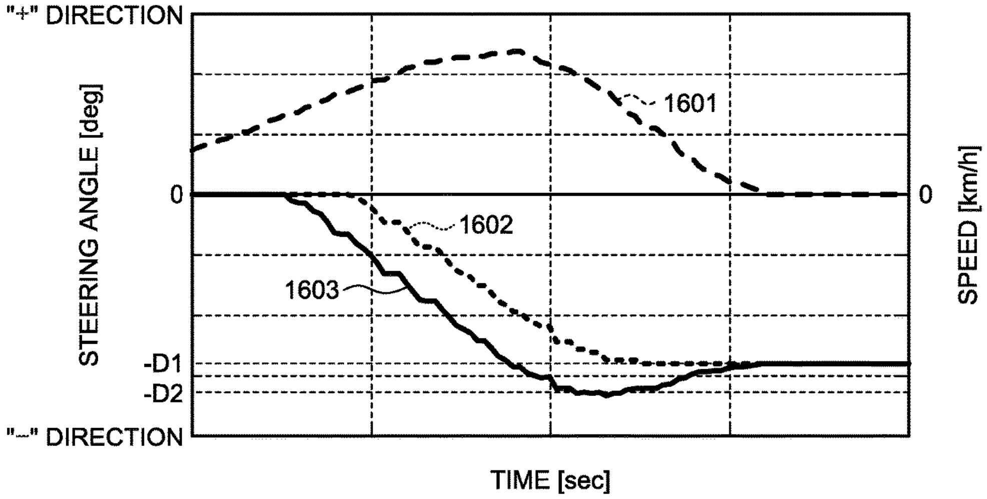
FIG. 16 is a diagram illustrating a relationship between the speed and the steering angle when a brake is applied to the vehicle according to the first embodiment.

FIG. 16 is a diagram illustrating a relationship between the speed and the steering angle when a brake is applied to the vehicle 1 according to the first embodiment. In the example illustrated in FIG. 16, the "+" direction of the steering angle is the right direction of the vehicle 1 while the "−" direction of the steering angle is the left direction of the vehicle 1, or vice versa.

As illustrated in FIG. 16, a speed 1601 increases and then decreases to '0' by an applied brake. Along with this, a target steering angle 1602 increases in the "−" direction (the steering angle increases in the left direction, for example) and then ceases to fluctuate around "−D1".

By contrast, a look-ahead steering angle 1603 is set to a steering angle at an advanced position by an estimated travel distance (x' m, for example) which is based on a delay time corresponding to the speed of the vehicle 1. When the speed of the vehicle 1 is decreased under the brake control, the look-ahead steering angle 1603 is set to a steering angle at an advanced position of the vehicle 1 by an estimated travel distance ((x'/10)m, for example) based on a delay time corresponding to the decreased speed. As a result, after the brake control over the vehicle 1, the position at which the look-ahead steering angle is acquired is moved relatively closer to the vehicle 1. Thus, the look-ahead steering angle 1603 increases in the "−" direction, falls below "−D2", and then increases gradually to around "−D1". In other words, the steering system 13 controls the steering wheel of the vehicle 1 to additionally turn in the left direction, and after a sudden braking, controls the steering wheel to return (turn back). Such a control makes the driver feel strangeness.

In view of this, in the present embodiment, at the time of deceleration (including sudden braking) of the vehicle 1, the steering wheel is controlled not to return.

In the present embodiment, when the position of the vehicle 1 at which the look-ahead steering angle is acquired is closer to the vehicle 1 than the previous position, a lock flag is set to "ON". At the lock flag "ON", the steering angle controller 506 provides the previous command steering angle to the steering system 13.

Figure 17:
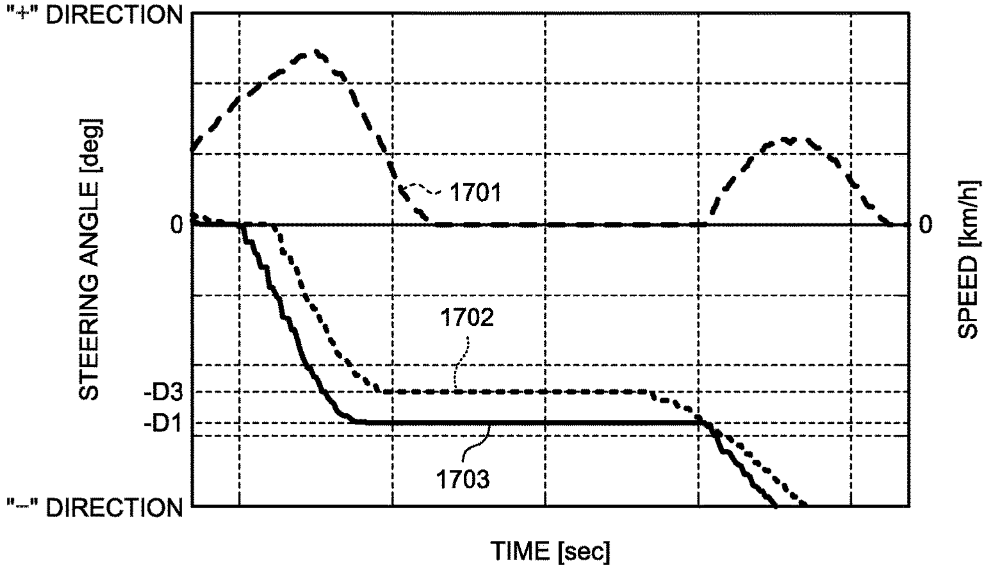
FIG. 17 is a diagram illustrating a relationship between the speed and the steering angle when a brake is applied to the vehicle according to the second embodiment.

FIG. 17 is a diagram illustrating a relationship between the speed and the steering angle when a brake is applied to the vehicle 1 according to the second embodiment. As illustrated in FIG. 17, a speed 1701 increases and then decreases to '0' when a brake is applied. Thereafter, the speed 1701 increases again and then decreases to '0'. Along with this, a target steering angle 1702 increases in the "−" direction and then becomes constant around "−D3" when the brake is applied. The target steering angle 1702 increases again in the "−" direction along with an increase in the speed 1701.

A look-ahead steering angle 1703 is set to a steering angle at an advanced position by an estimated travel distance (x' m, for example) based on a delay time corresponding to the speed of the vehicle 1. When, together with a decrease in the speed due to braking, the advanced position by the estimated travel distance approaches the vehicle 1 relatively, the lock flag is set to "ON". In this case, the steering angle controller 506 performs control to provide the steering system 13 with an instruction corresponding to the previous command steering angle. Thus, the look-ahead steering angle 1703 increases in the "−" direction and becomes constant around "−D1" since the steering angle controller 506 sets the lock flag to "ON" and performs the control corresponding to the previous command steering angle upon the applied brake. Thereafter, the look-ahead steering angle 1703 increases again in the "−" direction along with an increase in the speed 1701.

In other words, when the vehicle is located at a first position on the travel route and when an advanced position of the vehicle 1 based on the speed currently acquired by the sensor information acquirer 501 is closer to the first position than that based on the speed previously acquired by the sensor information acquirer 501, the steering angle controller 506 instructs the steering system 13 to continue a look-ahead steering angle corresponding to the advanced position of the vehicle 1 based on the previously acquired speed.

The steering angle controller 506 according to the present embodiment can hence prevent the position of a look-ahead steering angle from relatively approaching the vehicle 1 at the time of deceleration by a brake, thereby preventing the steering wheel from returning and preventing the driver from feeling strangeness.

A process by the ECU 14 of the vehicle 1 according to the present embodiment until shifting to parking assistance control is the same as in the flowchart in FIG. 12 of the first embodiment, and the description thereof is omitted.

Figure 18:
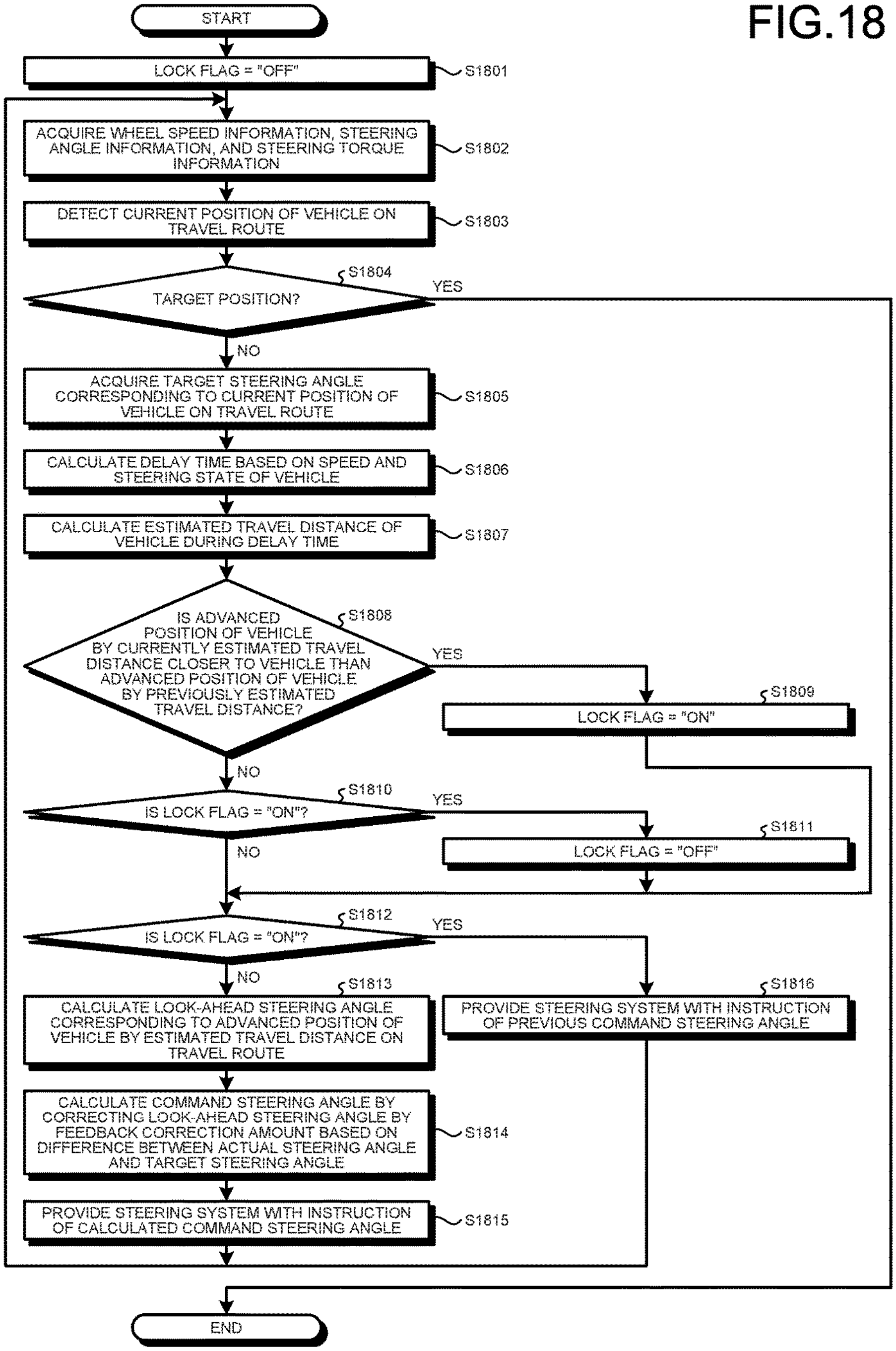
FIG. 18 is a flowchart illustrating a parking assistance control procedure of an ECU according to the second embodiment.

The following describes the parking assistance control at Step S1205 in FIG. 12 by the ECU 14 of the vehicle 1 according to the present embodiment. FIG. 18 is a flowchart of the above process by the ECU 14 according to the present embodiment.

The steering angle controller 506 first sets the lock flag to "OFF" (Step S1801). The sensor information acquirer 501 then acquires various information at least such as wheel speed information, steering angle information, and steering angle torque information from the various sensors (Step S1802).

The position detector 505 then detects a current position of the vehicle 1 based on the various information acquired by the sensor information acquirer 501 (Step S1803).

The ECU 14 then determines whether the detected current position is the target position (Step S1804).

If the ECU 14 determines that the detected current position is not the target position (No at Step S1804), the target steering angle acquirer 801 in the steering angle controller 506 acquires a target steering angle corresponding to the current position of the vehicle on the travel route, based on the travel route and the current position (Step S1805).

The delay time calculator 811 calculates a delay time based on the speed and the steering state (additional steering or turnback steering) of the vehicle (Step S1806).

The look-ahead steering angle calculator 802 then calculates an estimated travel distance in which the vehicle runs during the delay time (Step S1807).

The look-ahead steering angle calculator 802 then determines whether an advanced position by the currently calculated estimated travel distance is closer to the vehicle 1 than that by the previously calculated estimated travel distance (Step S1808). When determining that the former is closer to the latter (Yes at Step S1808), the look-ahead steering angle calculator 802 sets the lock flag to "ON" (Step S1809), and then the process proceeds to Step S1812.

Meanwhile, when determining that the advanced position by the currently calculated estimated travel distance is not closer, i.e., coincides with or is further, to the vehicle 1 than the advanced position by the previously calculated estimated travel distance (No at Step S1808), the look-ahead steering angle calculator 802 determines whether the lock flag is "ON" (Step S1810). When determining that the lock flag is "OFF" (No at Step S1810), the look-ahead steering angle calculator 802 performs no processing, and then the process proceeds to Step S1812. In contrast, when determining that the lock flag is "ON" (Yes at Step S1810), the look-ahead steering angle calculator 802 sets the lock flag to "OFF" (Step S1811), and then the process proceeds to Step S1812.

The look-ahead steering angle calculator 802 then determines whether the lock flag is "ON" (Step S1812).

Upon determining that the lock flag is not "ON", in other words, the lock flag is "OFF" (No at Step S1812), the look-ahead steering angle calculator 802 calculates a look-ahead steering angle corresponding to the advanced position by the estimated travel distance on the travel route (Step S1813).

The first calculator 803 calculates a difference between the target steering angle and the actual steering angle, and the PI controller 804 calculates a feedback correction amount by performing PI control over the difference; thereafter, the second calculator 805 calculates a command steering angle by correcting the look-ahead steering angle by the feedback correction amount (subtracting the feedback correction amount from the look-ahead steering angle) (Step S1814).

The steering angle controller 506 outputs the calculated command steering angle to the steering system 13 (Step S1815). The process is then repeated from Step S1802.

When determining that the lock flag is "ON" at Step S1812 (Yes at Step S1812), the look-ahead steering angle calculator 802 outputs, to the steering system 13, the previously output command steered angle (Step S1816). The process is then repeated from Step S1802.

Upon determining that the detected current position is the target position (Yes at Step S1804), the ECU 14 ends the process.

In the present embodiment, the ECU 14 performs the above processing, so that the steering is prevented from returning to a position closer to the vehicle 1 at the time of a decrease in the speed of the vehicle 1, whereby it is possible to prevent the driver from feeling strangeness. In the flowchart described above, the lock flag is set to "OFF" if the advanced position by the current estimated travel distance is the same as or farther to the vehicle 1 than that by the previous estimated travel distance. Setting the lock flag to "OFF", however, is not limited to such a case. Alternatively, the lock flag may be set to "OFF" upon regeneration of a travel route by the route generator 504. The route generator 504 may regenerate the travel route at any timing, for example, in every certain period of time.

In the present embodiment, the steering angle controller 506 outputs the previous command steering angle to the steering system 13 upon determining that the currently calculated estimated travel distance is closer to the vehicle 1 than the previously calculated estimated travel distance, as described above. Alternatively, the steering angle controller 506 may substitute the advanced position by the current estimated travel distance with that by the previous estimated travel distance, when determining that the currently calculated estimated travel distance is closer to the vehicle 1 than the previously calculated estimated travel distance. This can attain the same effects.

Furthermore, upon determining from the speed acquired by the sensor information acquirer 501 that the travel amount of the vehicle 1 does not change from the previous travel amount, the steering angle controller 506 may instruct the steering system 13 to maintain the previous steering angle.

Thereby, the steering wheel can be prevented from returning when the vehicle 1 is placed under brake control while running along a clothoid curve, for example. As described above, the present embodiment can prevent the driver from feeling strangeness in the steering by the steering system 13.

Modification of Second Embodiment

The second embodiment has described the example of setting the lock flag to "ON" according to the determination based on the speed and based on whether the advanced position by the currently calculated estimated travel distance is closer to the vehicle 1 than that by the previously calculated estimated travel distance. However, it is not intended to limit the condition for setting the lock flag to "ON" to the condition based on the estimated travel distance calculated from the speed. A modification describes an example of setting the lock flag based on acceleration.

The look-ahead steering angle calculator 802 according to the modification determines whether acceleration acquired by the sensor information acquirer 501 is equal to or lower than a predetermined threshold value. If the acceleration is equal to or lower than the predetermined threshold value, the look-ahead steering angle calculator 802 sets the lock flag to "ON". The threshold value is set to satisfy the condition in the case of negative acceleration such as sudden braking. Thereby, sudden braking causes the lock flag to switch to "ON", so that the modification can attain the same effects as those of the second embodiment.

The condition for setting the lock flag to "OFF" may be larger acceleration than the predetermined threshold value or start of driving of the vehicle 1, for example.

As described above, according to the aforementioned embodiments, the steering system 13 controls the steering in accordance with the command steered angle obtained by looking ahead a travel route of the vehicle 1, so that a steering delay can be prevented and the traveling accuracy of the vehicle 1 along the travel route can be improved.

Although some embodiments of the present invention have been described, they are presented by way of example and are not intended to limit the scope of the present invention. These novel embodiments can be achieved in other various forms, and various omissions, substitutions, and modifications can be made without departing from the gist of the invention. These embodiments and modifications thereof are included in the scope and the gist of the invention, and are also included in the invention described in the claims and the equivalent thereof.

A note is disclosed regarding the embodiments described above.

<Note>

When steering of a running vehicle is switched between additional steering and turnback steering on a travel route, a controller (steering angle controller, for example) controls the steering to gradually change a steering angle adjusted based on the additional steering and a steering angle adjusted based on the turnback steering.

The invention claimed is:

1. A vehicle control device comprising:

a memory configured to store therein a software; and at least one processor configured to execute the software, wherein the software when executed causes the at least one processor to implement:

a steering controller configured to control steering of a vehicle;

a controller configured to, when the vehicle is located at a first position on a travel route, instruct the steering controller to control the vehicle at a steering angle corresponding to a second position, the second position being an advanced position of the vehicle from the first position in a traveling direction on the travel route; and an acquirer configured to acquire a speed or acceleration of the vehicle, wherein when the vehicle is located at the first position on the travel route and when the second position of the vehicle advancing based on the speed or acceleration currently acquired by the acquirer is closer to the first position than a third position of the vehicle advancing based on the speed or acceleration previously acquired, the controller instructs the steering controller to continue a steering angle corresponding to the third position.

2. The vehicle control device according to claim 1, wherein the software when executed causes the at least one processor to further implement a generator configured to generate a travel route to guide the vehicle to a target position, wherein when the vehicle is located at the first position on the travel route generated by the generator, the controller instructs the steering controller to control the vehicle at a steering angle corresponding to the second position on the travel route.

3. The vehicle control device according to claim 1, wherein the software when executed causes the at least one processor to further implement a speed acquirer configured to acquire a speed of the vehicle, wherein the controller instructs the steering controller to control the vehicle at a steering angle adjusted in accordance with a delay time, the delay time being a time based on the speed of the vehicle acquired by the speed acquirer from a receipt of a steering command by the steering controller to a start of steering.

4. The vehicle control device according to claim 1, wherein the software when executed causes the at least one processor to further implement a steering acquirer configured to acquire information on steering performed in the vehicle, wherein the controller instructs the steering controller to control the vehicle at a steering angle depending on a result of determination of whether the steering of the vehicle corresponds to additional steering, based on the information on steering acquired by the steering acquirer.

5. The vehicle control device according to claim 1, wherein the software when executed causes the at least one processor to further implement a steering angle acquirer configured to acquire a steering angle of the vehicle, wherein the controller corrects a steering angle corresponding to the second position to be provided to the steering controller, based on a difference between a steering angle corresponding to the first position and the steering angle of the vehicle acquired by the steering angle acquirer.

* * * * *